A. L. LEONARD.
HEATER.
APPLICATION FILED OCT. 1, 1907.
899,546.                                  Patented Sept. 29, 1908.
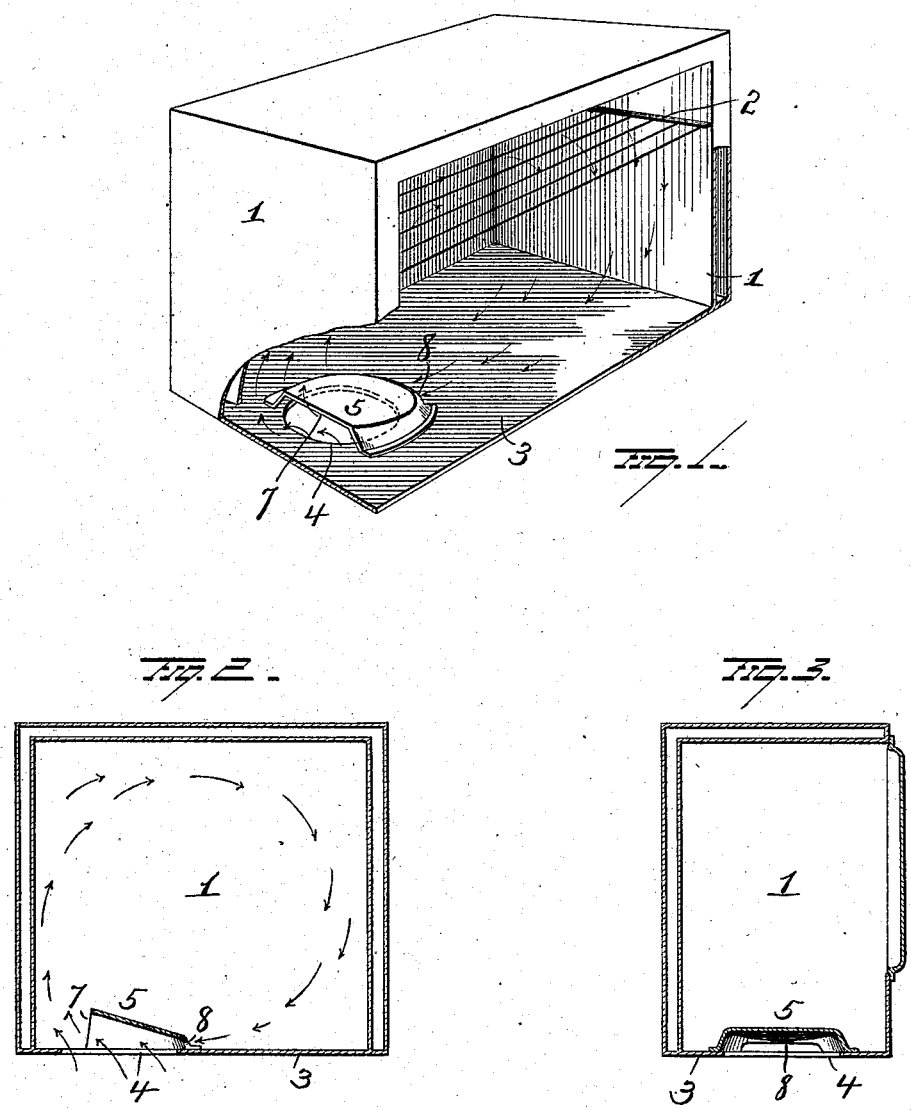

UNITED STATES PATENT OFFICE.

ALEXANDER LEWIS LEONARD, OF COLUMBUS, GEORGIA.

HEATER.

No. 899,546.     Specification of Letters Patent.     Patented Sept. 29, 1908.

Application filed October 1, 1907. Serial No. 395,401.

*To all whom it may concern:*

Be it known that I, ALEXANDER L. LEONARD, of Columbus, in the county of Muscogee and State of Georgia, have invented certain new and useful Improvements in Heaters; and I do hereby declare the following to be a full, clear, and exact description of the invention, such as will enable others skilled in the art to which it appertains to make and use the same.

My invention relates to improvements in heating and cooking devices and more particularly to such as are adapted for use in coöperation with gas, oil and gasolene stoves,— one object of the invention being to provide means to insure the retention and adequate circulation of hot air within an oven, furnace or other form of heating device.

A further object is to provide means whereby the interior extent of an oven or heating device can be maintained at a uniform temperature of high degree with the consumption of a minimum amount of fuel.

With these objects in view, the invention consists in certain novel features of construction and combinations and arrangements of parts as hereinafter set forth and pointed out in the claims.

In the accompanying drawings: Figure 1 is a perspective view, partly broken away, illustrating my improvements; Fig. 2 is a longitudinal sectional view, and Fig. 3 is a transverse sectional view.

In the drawing, I have illustrated my invention as applied to a portable oven, such as usually constructed of sheet metal and adapted to be placed upon a stove employing liquid or gaseous fuel. It is apparent however that my improvements are equally useful with a stationary oven or with a furnace or heating drum, regardless of the material of which the same may be constructed.

1 represents a portable oven provided interiorly with racks 2 supported in any suitable manner.

The bottom 3 of the heating device is provided with a hole 4. For the purpose of my invention, this hole is located near one of the walls of the device, preferably one of the end walls. A hood or deflector 5 is located within the device and placed upon the bottom thereof in such manner as to project partially over the hole 4,—preferably about three-fourths way over said hole. The hood or deflector 5 is so constructed that its front end will be more elevated above the bottom 3, adjacent to the end wall of the oven near which the hood is disposed, than at the opposite end of said hood, thus making the top of the hood inclined. I prefer to make the front end of the hood or deflector about three times as high as the back or rear end. The hood is provided at its higher, front end with a comparatively large opening 7. At its rear or back end, the hood is made with an opening 8 which is much smaller then the opening 7.

The device will be so placed upon a stove or over a burner, that the hole 4 will be directly over a hot plate or flame, and by so locating this hole and the hood over the same, near one end of the oven and by providing a large opening at the end of the hood near the end wall of the oven and a smaller opening at the opposite end of the hood, the heated air from the stove or burner will pass through the larger opening of the hood and enter the interior of the oven or heater, thereby creating a suction within the same and causing the air to pass under the hood, such air entering the hood through the smaller opening thereof. In this way, I am enabled to insure an effectual circulation of air throughout all portions of the oven or heater; heating and reheating the air and maintaining a uniform temperature in all parts of the oven or heater, with the use of a minimum amount of fuel.

Having fully described my invention, what I claim as new and desire to secure by Letters Patent is:

1. The combination with a chamber to be heated, said chamber having a hole in its bottom, at one side of its center, of a hood or deflector projecting over said opening and provided with diametrically opposite openings varying in size and both communicating with the interior of said chamber.

2. The combination with a chamber to be heated, said chamber having a hole in its bottom at one side of its center, of a hood or deflector projecting partially over said hole and provided with diametrically opposite openings varying in size and both communicating with the interior of said chamber.

3. The combination with a chamber to be heated, said chamber having a hole in its bottom at one side of its center, of a hood higher at one end than at the other and having an opening at each end, the opening at the higher end being larger than the opening at the opposite end of the hood, said higher end of the hood terminating over the hole in the bottom of the heating chamber.

4. The combination with a chamber to be heated, said chamber provided with a hole in its bottom near one wall of the same, of a hood disposed partially over said hole, said hood having an opening adjacent to said wall of the chamber and also having a smaller opening diametrically opposite the first mentioned opening both of said openings communicating with the interior of said chamber.

5. The combination with a chamber to be heated, said chamber having a hole in its bottom near one wall thereof, of a hood disposed partially over said hole and having greater height at one end than at the other, said hood having a comparatively large opening at the higher end thereof and a small opening at the opposite end, and having an inclined top.

6. The combination with a chamber to be heated, provided with a hole in its bottom, of a deflecting hood situated over said hole, said hood provided with an outlet leading toward one side of said chamber and with an inlet leading from the opposite side of said chamber.

7. The combination with a chamber to be heated provided in its bottom with a hole, of a hood situated over said hole, said hood having an outlet opening at one side and a smaller inlet opening at the opposite side, both of said openings communicating with the interior of said chamber.

In testimony whereof I have signed this specification in the presence of two subscribing witnesses.

ALEXANDER LEWIS LEONARD.

Witnesses:
OLIVE R. RUSSELL,
THOS. G. KING.